United States Patent [19]
Schwarz, Jr.

[11] Patent Number: 6,005,022
[45] Date of Patent: Dec. 21, 1999

[54] INK COMPOSITIONS CONTAINING CATIONIC AMIDO AMINE POLYMERS

[75] Inventor: William M. Schwarz, Jr., Webster, N.Y.

[73] Assignee: Xerox Corporation, Stamford, Conn.

[21] Appl. No.: 09/046,849

[22] Filed: Mar. 24, 1998

[51] Int. Cl.[6] .................... C09D 11/02; C09D 11/10; C09D 133/24
[52] U.S. Cl. ............... 523/160; 523/161; 106/31.43
[58] Field of Search ................... 523/160, 161; 106/31.27, 31.29, 31.58, 31.43

[56] References Cited

U.S. PATENT DOCUMENTS

| | | | |
|---|---|---|---|
| 4,197,135 | 4/1980 | Bailey et al. | 106/23 |
| 4,267,088 | 5/1981 | Kempf | 260/29.2 EP |
| 4,659,382 | 4/1987 | Kang | 106/22 |
| 5,019,166 | 5/1991 | Schwarz | 106/22 |
| 5,223,338 | 6/1993 | Malhotra | 428/342 |
| 5,250,107 | 10/1993 | Bares | 106/20 R |
| 5,271,765 | 12/1993 | Ma | 524/83 |
| 5,531,818 | 7/1996 | Lin et al. | 106/31.28 |

*Primary Examiner*—Vasu Jagannathan
*Assistant Examiner*—Callie E. Shosho
*Attorney, Agent, or Firm*—Judith L. Byorick

[57] ABSTRACT

Disclosed is an ink composition which comprises (1) water; (2) a dye; and (3) a cationic amido amine copolymer. Also disclosed are methods for using the aforementioned ink composition in ink jet printing processes.

20 Claims, No Drawings

INK COMPOSITIONS CONTAINING CATIONIC AMIDO AMINE POLYMERS

BACKGROUND OF THE INVENTION

The present invention is directed to ink compositions and to processes for the preparation and use thereof. More specifically, the present invention is directed to compositions suitable for use in ink jet printing processes. One embodiment of the present invention is directed to an ink composition which comprises (1) water; (2) a dye; and (3) a cationic amido amine copolymer.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of page width ejector arrays, ranging from single row, sparse arrays for hybrid forms of parallel/serial printing to multiple row staggered arrays with individual ejectors for each of the pixel positions or addresses within a page width image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in J. Appl. Phys., vol. 65, no. 9 (May 1, 1989) and references therein, the disclosure of which is totally incorporated herein by reference.

U.S. Pat. No. 5,250,107 (Bares), the disclosure of which is totally incorporated herein by reference, discloses a water-fast ink composition and method for making the same. A selected chemical dye having at least one functional group with an extractable hydrogen atom thereon (e.g. —COOH, —NH$_2$, or —OH) is combined with an ammonium zirconium polymer salt (e.g. ammonium zirconium carbonate, ammonium zirconium acetate, ammonium zirconium sulfate, ammonium zirconium phosphate, and ammonium zirconium oxalate). The resulting mixture preferably contains about 0.01–5.0% by weight ammonium zirconium polymer salt and about 0.5–5.0% by weight chemical dye. Upon dehydration of the mixture, the ammonium zirconium polymer salt and chemical dye form a cross-linked dye complex which is stable and water-fast. The mixture may be dispensed onto a variety of substrates (e.g. paper) using thermal ink jet or other printing systems.

U.S. Pat. No. 4,267,088 (Kempf), the disclosure of which is totally incorporated herein by reference, discloses coatings particularly useful as marking inks in which an epichlorohydrin-modified polyethyleneimine and an ethylene oxide-modified polyethyleneimine cooperate in aqueous solution to form a composition capable of application to form deposits adherent to most materials and resistant to most organic solvents but readily removable by water.

U.S. Pat. No. 4,197,135 (Bailey et al.), the disclosure of which is totally incorporated herein by reference, discloses an ink for use in ink jet printers containing a water soluble dye and a polyamine containing 7 or more nitrogen atoms per molecule, with the ink composition having a pH of 8 or above, the upper pH limit being dye decomposition dependent. The ink has improved waterfastness over an equivalent ink formulation without the polyamine additive.

U.S. Pat. No. 4,659,382 (Kang), the disclosure of which is totally incorporated herein by reference, discloses an ink jet ink composition comprising a major amount of water, a hydroxyethylated polyethyleneimine polymer, and a dye component, wherein the polymer has incorporated therein from about 65 to about 80 percent by weight of hydroxyethyl groups.

U.S. Pat. No. 5,019,166 (Schwarz), the disclosure of which is totally incorporated herein by reference, discloses a thermal ink jet printing composition comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof. Also disclosed is a process for generating images which comprises causing the ink compositions to be ejected from a thermal ink jet printer in imagewise fashion onto a substrate.

Japanese Patent publication 57-198768, the disclosure of which is totally incorporated herein by reference, discloses a type of water-base ink made of acidic dye and/or direct dye, cationic water-soluble resin, water-soluble organic solvent, and water.

Copending application U.S. Ser. No. 09/046,895, filed concurrently herewith, entitled "Ink Compositions and Multicolor Thermal Ink Jet Printing Process for the Production of High Quality Images," with the named inventor John Wei-Ping Lin, the disclosure of which is totally incorporated herein by reference, discloses a set of inks for printing multicolor images in an ink jet printer, said ink set comprising (A) a first ink having a first color and comprising water and a colorant selected from the group consisting of (1) anionic dyes, (2) dyes having physically or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; and (B) a second ink comprising water, an optional colorant having a color other than the first color, and an ammonium salt having at least two cationic ammonium functional groups, wherein the colorant in the first ink is capable of being immobilized on a printing substrate by interaction with the ammonium salt having at least two cationic ammonium functional groups in the second ink.

Copending application U.S. Ser. No. 047,097, filed concurrently herewith, entitled "Ink Compositions With Improved Waterfastness and Smear Resistance," with the named inventors Kurt B. Gundlach, Richard L. Colt, Luis A. Sanchez, Maura A. Sweeney, and Edward J. Radigan, Jr., the disclosure of which is totally incorporated herein by reference, discloses an ink composition which comprises water, an anionic dye, and a polyquaternary amine compound selected from the group consisting of polydiallyl dimethyl ammonium compounds, polyquaternized polyvinylamines, polyquaternized polyallylamines, and mixtures thereof. Also disclosed are methods for using the aforementioned ink composition in ink jet printing processes.

Copending application U.S. Ser. No. 046,852, filed concurrently herewith, entitled "Ink Compositions With Improved Shelf Stability", with the named inventors Kurt B. Gundlach, Luis A. Sanchez, Richard L. Colt, Maura A. Sweeney, and William M. Schwarz, the disclosure of which is totally incorporated herein by reference, discloses an ink composition which comprises (1) water; (2) a nonpolymeric salt comprising at least one cation and at least one anion; and (3) a colorant comprising an anionic dye complexed with a polyquaternary amine compound. Also disclosed is an ink composition which comprises (1) water; (2) a nonpolymeric salt comprising at least one cation and at least one anion; (3) an anionic dye; and (4) a polyquaternary amine compound. In one embodiment, the polyquaternary amine compound is selected from the group consisting of polydiallyl dimethyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

Copending application U.S. Ser. No. 09/047,278, filed concurrently herewith, entitled "Ink Compositions Containing Vinyl Pyrrolidinone/Vinyl Imidazolium Copolymers", with the named inventor William M. Schwarz, the disclosure of which is totally incorporated herein by reference, discloses an ink composition which comprises (1) water; (2) an anionic dye; and (3) a copolymer of vinyl pyrrolidinone and a vinyl imidazolium salt. Also disclosed are methods for using the aforementioned ink compositions in ink jet printing processes.

While known compositions and processes are suitable for their intended purposes, a need remains for improved ink compositions suitable for ink jet printing processes. In addition, a need remains for ink compositions with improved waterfastness. Further, a need remains for ink compositions with improved wet smear resistance. Additionally, a need remains for ink compositions with reduced intercolor bleed when two or more colors are printed adjacent to each other. There is also a need for ink compositions for ink jet printing which contain acid dyes, which enable advantages such as bright colors, low cost, and high waterfastness when complexed with cationic polymers. In addition, there is a need for ink compositions with improved lightfastness. Further, there is a need for ink compositions suitable for use in ink jet printing processes and having relatively low viscosities. Additionally, there is a need for ink compositions which exhibit excellent smear resistance. A need also remains for ink compositions suitable for ink jet printing which exhibit reduced kogation in ink jet printer hardware. In addition, a need remains for ink compositions with desirable surface tension values for ink jet printing. Further, a need remains for ink compositions with good latency in ink jet printing processes. Additionally, a need remains for ink compositions which exhibit shelf stability with respect to hydrolysis.

SUMMARY OF THE INVENTION

It is an object of the present invention to provide ink compositions with the above noted advantages.

It is another object of the present invention to provide improved ink compositions suitable for ink jet printing processes.

It is yet another object of the present invention to provide ink compositions with improved waterfastness.

It is still another object of the present invention to provide ink compositions with improved wet smear resistance.

Another object of the present invention is to provide ink compositions with reduced intercolor bleed when two or more colors are printed adjacent to each other.

Yet another object of the present invention is to provide ink compositions for ink jet printing which contain acid dyes, which enable advantages such as bright colors, low cost, and high waterfastness when complexed with cationic polymers.

Still another object of the present invention is to provide ink compositions with improved lightfastness.

It is another object of the present invention to provide ink compositions suitable for use in ink jet printing processes and having relatively low viscosities.

It is yet another object of the present invention to provide ink compositions which exhibit excellent smear resistance.

It is still another object of the present invention to provide ink compositions suitable for ink jet printing which exhibit reduced kogation in ink jet printer hardware.

Another object of the present invention is to provide ink compositions with desirable surface tension values for ink jet printing.

Yet another object of the present invention is to provide ink compositions with good latency in ink jet printing processes.

Still another object of the present invention is to provide ink compositions which exhibit shelf stability with respect to hydrolysis.

These and other objects of the present invention (or specific embodiments thereof) can be achieved by providing an ink composition which comprises (1) water; (2) a dye; and (3) a cationic amido amine copolymer.

DETAILED DESCRIPTION OF THE INVENTION

Inks of the present invention contain an aqueous liquid vehicle, a dye, and a cationic amido amine copolymer. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The ink also contains a copolymer of an amine and an amide. In one embodiment, the copolymer is of the general formula

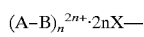

wherein X is an anion, such as Cl—, Br, I—, $HSO_4$—, $HSO_3$—, $SO_4^{2-}$, $SO_3^{2-}$, $CH_2SO_3$—, $CH_3SO_3$—, $CH_3C_6H_4SO_3$—, $NO_3$—, HCOO—, $CH_3COO$—, $HCO_3$—, $CO_3^{2-}$, $H_2PO_4$—, $HPO_4^{2-}$, $PO_4^{3-}$, SCN—, $BF_4$—, $ClO_4$—, $SSO_3$—, or the like, n is an integer representing the number of repeating monomer units, and typically is from about 2 to about 1,000, preferably from about 3 to about 200, more preferably from about 3 to about 100, and even more preferably from about 3 to about 10, although the value can be outside of these ranges, "A" is

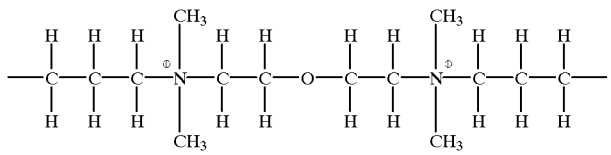

and "B" is selected from the group consisting of (a) monomers of the formula

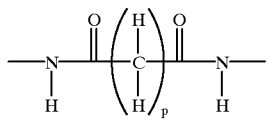

wherein p is an integer representing the number of repeat monomer units, and typically is from 1 to about 12, preferably from 1 to about 7, and more preferably from 1 to about 4, although the value can be outside of these ranges, such as (i) azelaic acid diamido, wherein p is 7, of the formula

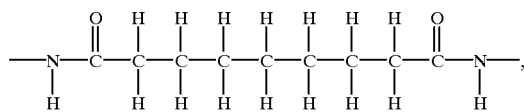

or (ii) adipic acid diamido, wherein p is 4, of the formula

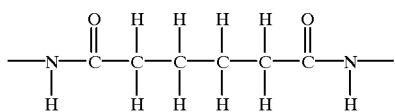

and (b) ureido, of the formula

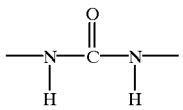

Mixtures of two or more "B" monomers can also be used within the polymer. In a preferred embodiment, these specific polymers typically are condensation polymers, with alternating "A" and "B" monomer units. The weight average molecular weight of the polymer typically is from about 1,000 to about 100,000, preferably from about 1,000 to about 30,000, and more preferably from about 2,000 to about 5,000, although the value can be outside of these ranges. Copolymers of an amine and an amide are commercially available from, for example, Rhone-Poulenc, Cranbury, N.J., as, for example, MIRAPOL AZ-1, of the above formula wherein the "B" monomer is azelaic acid diamido, n has an average value of about 100, and the molecular weight is about 50,000, MIRAPOL AD-1, of the above formula wherein the "B" monomer is adipic acid diamido, n has an average value of about 100, and the molecular weight is about 50,000, and MIRAPOL A-15, of the above formula wherein the "B" monomer is ureido, n has an average value of about 6, and the molecular weight is about 2,260. The polymer is present in the ink in any desired or suitable amount, preferably from about 0.1 to about 20 percent by weight of the ink, more preferably from about 0.5 to about 10 percent by weight of the ink, and even more preferably from about 1 to about 5 percent by weight of the ink, although the amount can be outside of these ranges.

The dye can be any suitable or desired dye, including cationic dyes, anionic dyes, and the like, with anionic dyes being preferred. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No.1, 8, 32, 35, 37, 52, 57, 92, 115, 119, 154, 249, 254, 256, and the like), Acid Blue dyes (No.1, 7, 9, 25, 40, 45, 62, 78, 80, 92, 102, 104, 113, 117, 127, 158, 175, 183, 193, 209, and the like), Acid Yellow dyes (No.3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bemacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-1 75; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 10 percent by weight of the ink, preferably from about 0.1 to about 7 percent by weight of the ink, and more preferably from about 1 to about 5 percent by weight of the ink, although the amount can be outside of these ranges.

In some embodiments of the present invention, the ink also contains an ionic compound (in addition to and other than) the copolymer to enhance the solubility of the copolymer in the ink. One example of a suitable ionic compound is an alkyl amine quaternary salt, such as ETHOQUAD C/12, of the formula

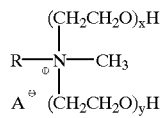

wherein R is a long chain alkyl group with 12 carbon atoms, x and y are integers of 0, 1, or 2 representing the number of ethoxy groups, wherein x+y=2, and A is any desired or suitable anion, such as chloride, commercially available from Akzo Chemie, Chicago, Ill.

Any other desired or suitable ionic compound can also be employed. The ionic compound contains at least one cation and at least one anion. Examples of suitable cations include alkali metal cations, such as $Li^+$, $Na^+$, and $K^+$, alkaline earth metal cations, such as $Mg^{2+}$ and $Ca^{2+}$, nonpolymeric or monomeric ammonium and quaternary amine cations, including those of the general formula

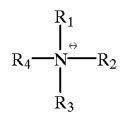

wherein each of $R_1$, $R_2$, $R_3$, and $R_4$, independently of the others, is a hydrogen atom, an alkyl group (including saturated, unsaturated, cyclic, and substituted alkyl groups, wherein substituted alkyl groups can include alkoxy or polyalkoxy groups such as ethylene oxide, polyethylene oxide, or the like), preferably with from 1 to about 10 carbon atoms and more preferably with from 1 to about 4 carbon atoms, although the number of carbon atoms can be outside of this range, aryl groups, including substituted aryl groups, preferably with from 6 to about 18 carbon atoms and more preferably with from 6 to about 12 carbon atoms, although the number of carbon atoms can be outside of this range, or arylalkyl groups, preferably with from 7 to about 20 carbon atoms and more preferably with from 7 to about 13 carbon atoms, wherein the substituents on the substituted alkyl, aryl, and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, with specific examples of ammonium and quaternary amine cations including $NH_4^+$, $N(CH_3)_4^+$, $H_3NCH_2CH_2NH_3^{2+}$, $(H_3C)_3NCH_2CH_2N(CH_3)_3^{2+}$, imidazolium, quaternized 1,4-diazabicclo(2.2.2)octane, choline, of the formula

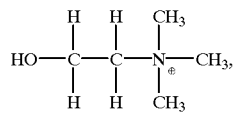

and the like, as well as mixtures thereof. Any desired anion can be employed. Examples of suitable anions include $SO_4^{2-}$, $CO_3^{2-}$, $NO_3^{2-}$, $ClO_4^{2-}$, organic acid anions, such as formate, acetate, propionate, and the like, acetylacetonate, of the formula

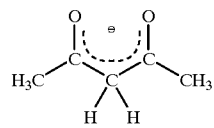

squarate, of the formula

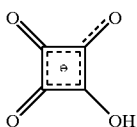

halides, including chloride, bromide, and iodide, and the like, as well as mixtures thereof. Specific examples of suitable salts include lithium chloride, lithium bromide, lithium iodide, lithium nitrate, lithium formate, lithium acetate, lithium propionate, sodium chloride, sodium bromide, sodium iodide, sodium nitrate, sodium perchlorate, sodium formate, sodium acetate, sodium propionate, potassium chloride, potassium bromide, potassium iodide, potassium formate, potassium acetate, potassium propionate, calcium chloride, calcium nitrate, calcium formate, calcium acetate, calcium propionate, magnesium chloride, magnesium sulfate, magnesium formate, magnesium acetate, magnesium propionate, ammonium chloride, ammonium bromide, ammonium iodide, ammonium acetate, ammonium formate, ammonium nitrate, ammonium sulfate, ammonium propionate, tetramethylammonium chloride, tetramethylammonium formate, tetramethylammonium acetate, tetramethylammonium propionate, ethylene diamine dihydrochloride, 1,4-diazabicyclo(2.2.2)octane salts, such as hexamethonium bromide, of the formula

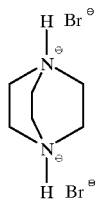

imidazole salts, such as imidazolium chloride, acetylacetonate salts, such as lithium acetylacetonate, squarate salts, such as tetramethylammonium squarate, choline salts, such as choline chloride, and the like. The salt can also be a complex salt, including transition metal complexes such as $Zn(NH_3)_4$ or the like.

When present, the ionic compound is present in the ink in any desired or effective amount, typically from about 0.2 to about 10 percent by weight of the ink, preferably from about 0.5 to about 5 percent by weight of the ink, and more preferably from about 1 to about 3 percent by weight of the ink, although the amount can be outside of these ranges.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

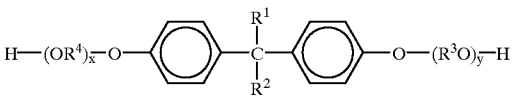

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, J. Molecular Science—Rev. MacromoL Chem. Phys., C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 250° C.), typically, the ink viscosity is no more than about 10 centipoise, and preferably is from about 1 to about 5 centipoise, more preferably from about 1 to about 4 centipoise, although the viscosity can be outside this range.

Ink compositions of the present invention can be of any suitable or desired pH. For some embodiments, such as thermal ink jet printing processes, typical pH values are from about 3 to about 11, preferably from about 5 to about 10, and more preferably from about 7 to about 8, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering. In a preferred embodiment, the ink ingredients are mixed in the following order: (1) water; (2) any salts present in the ink; (3) any cosolvents or humectants present in the ink; (4) polyquatenary compound; (5) dye. If the polyquaternary compound and the dye are added to water prior to addition of salts and/or cosolvents and/or humectants, a precipitated complex may form, which generally will tend to dissolve slowly to homogeneity subsequent to addition of the other ink ingredients.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A base ink composition was prepared by simple mixing of the following ingredients:

| Ingredient | Supplier | Amount (grams) |
|---|---|---|
| PROJET YELLOW OAM (Acid Yellow 23) dye* | Zeneca Colors | 107.57 |
| DOWICIL 150/200 biocide | Dow Chemical Co. | 0.2 |
| polyethylene oxide** | Polysciences | |
| imidazole | American Biorganics | 2 |
| ethylene diamine tetraacetic acid | Dow Chemical Co. | 0.13 |
| urea | Arcadian Corp. | 12 |
| sulfolane*** | Phillips Petroleum Co. | 30 |
| butyl carbitol | Van Waters & Rogers | 24 |

*aqueous solution containing 7.5 wt. % dye and 92.5 wt. % water
**bisphenol-A derivative, molecular weight 18,500, of the formula

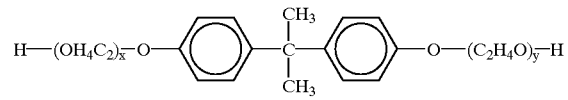

***containing 95 wt. % sulfolane and 5 wt. % water

Thereafter ink compositions were prepared by admixing various amounts of three different cationic amido amine copolymers (shown in the table below as number of grams of copolymer solids contained in the ink; since the copolymers were supplied by Rhone-Poulenc as aqueous solutions containing 64 percent by weight copolymer and 36 percent by weight water, the ink contained 0.36 gram of water from this solution for every 0.64 gram of copolymer added) as shown in the table below, various amounts of deionized water (shown in the table below as number of grams deionized water added to the ink in addition to that from the aqueous copolymer solution), and amounts of the base ink formulation previously prepared such that the total amount of ink in each case was 100 grams. The inks thus prepared were hand coated onto Xerox® Image Series LX paper with a #7 Meier rod and air dried for at least 24 hours. The inks were tested for wet smear (WS) by passing a weighted (100 grams pressure) water saturated felt tip (similar to those found in marking pens) across the ink image, which transferred some of the dye outside of the original image area and onto the adjacent virgin paper, and measuring the optical density of the dye transferred onto the virgin paper. The inks were tested for waterfastness (WF) by punching sample patches from the generated images, submerging the patches in a beaker of distilled water, agitating the water with a slowly moving stirring bar, removing the patches after 5 minutes and allowing them to air dry, and measuring the optical density of the images subsequent to soaking; waterfastness was calculated as a percentage, i.e., $(OD_{final} \div OD_{initial}) \times 100 = WF$. Optical density (OD) of the images was also recorded. The results for each ink are in the table below, along with the viscosity of each ink ($\eta$, centipoise):

| copolymer | amount copolymer | amount water added | OD | WS | WF | $\eta$ |
|---|---|---|---|---|---|---|
| none (control) | — | 22 | 1.00 | 0.10 | 44 | 2.1 |
| MIRAPOL AZ-1 | 1 | 20 | 1.00 | 0.08 | 62 | 2.6 |
| MIRAPOL AZ-1 | 2 | 19 | 0.99 | 0.08 | 70 | 3.1 |
| MIRAPOL AZ-1 | 3 | 17 | 0.99 | 0.07 | 76 | 3.7 |
| MIRAPOL AD-1 | 1 | 19 | 1.00 | 0.08 | 56 | 2.5 |
| MIRAPOL AD-1 | 2 | 19 | 0.97 | 0.05 | 79 | 2.0 |
| MIRAPOL AD-1 | 3 | 17 | 0.95 | 0.04 | 78 | 3.1 |
| MIRAPOL A-15 | 1 | 18* | 0.96 | 0.06 | 74 | 2.3 |
| MIRAPOL A-15 | 2 | 19** | 0.95 | 0.03 | 89 | 3.4 |
| MIRAPOL A-15 | 3 | 19 | 0.92 | 0.05 | 88 | 4.1 |

*water added contained 3 percent by weight ETHOQUAD C/12 (Akzo Chemie, Chicago, IL)
**water added contained 1 percent by weight ETHOQUAD C/12

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises (1) water; (2) a dye; and (3) a cationic amido amine copolymer.

2. An ink composition according to claim 1 wherein the copolymer is of the formula $$(A-B)_n^{2n+} \cdot 2nX—$$

wherein X is an anion, n is an integer representing the number of repeating monomer units, "A" is

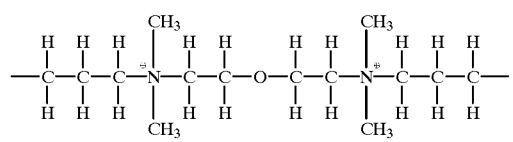

and "B" is selected from the group consisting of (a) monomers of the formula

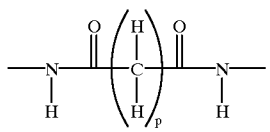

wherein p is an integer representing the number of repeat monomer units, (b) ureido, and (c) mixtures thereof.

3. An ink composition according to claim 2 wherein "B" is azelaic acid diamido.

4. An ink composition according to claim 2 wherein "B" is adipic acid diamido.

5. An ink composition according to claim 2 wherein "B" is ureido.

6. An ink composition according to claim 2 wherein n is from about 2 to about 1,000.

7. An ink composition according to claim 2 wherein n is from about 3 to about 200.

8. An ink composition according to claim 2 wherein n is from about 3 to about 100.

9. An ink composition according to claim 2 wherein n is from about 3 to about 10.

10. An ink composition according to claim 1 wherein the copolymer has a weight average molecular weight of from about 1,000 to about 100,000.

11. An ink composition according to claim 1 wherein the copolymer has a weight average molecular weight of from about 1,000 to about 30,000.

12. An ink composition according to claim 1 wherein the copolymer has a weight average molecular weight of from about 2,000 to about 5,000.

13. An ink composition according to claim 1 wherein the copolymer is present in the ink in an amount of from about 0.1 to about 20 percent by weight of the ink.

14. An ink composition according to claim 1 wherein the dye is present in the ink in an amount of from about 0.05 to about 10 percent by weight of the ink.

15. An ink composition according to claim 1 further containing a material of the formula

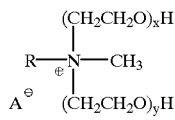

wherein R is a long chain alkyl group with 12 carbon atoms, x and y are integers of 0, 1, or 2 representing the number of ethoxy groups, wherein x+y=2, and A is an anion.

16. An ink composition according to claim 1 wherein the dye is an anionic dye.

17. An ink composition according to claim 16 wherein the dye is selected from the group consisting of Acid dyes, Direct dyes, Reactive dyes, and mixtures thereof.

18. An ink composition according to claim 1 wherein the dye is a cationic dye.

19. A process which comprises (i) incorporating into an ink jet printing apparatus an ink composition according to claim 1; and (ii) causing droplets of the ink composition to be ejected in an imagewise pattern onto a substrate.

20. A process according to claim 19 wherein the printing apparatus employs a thermal ink jet process wherein the ink in the nozzles is selectively heated in an imagewise pattern, thereby causing droplets of the ink to be ejected in imagewise pattern.

\* \* \* \* \*